(No Model.)

W. GLEDHILL.
NUT LOCK.

No. 448,183. Patented Mar. 10, 1891.

WITNESSES:
P. F. Nagle
L. Douville

INVENTOR
Walter Gledhill
BY
ATTORNEY.

UNITED STATES PATENT OFFICE.

WALTER GLEDHILL, OF CLIFTON, PENNSYLVANIA, ASSIGNOR OF ONE-HALF TO JAMES SMETHURST, OF ST. HELEN'S, ENGLAND.

NUT-LOCK.

SPECIFICATION forming part of Letters Patent No. 448,183, dated March 10, 1891.

Application filed October 7, 1890. Serial No. 367,321. (No model.)

*To all whom it may concern:*

Be it known that I, WALTER GLEDHILL, a citizen of the United States, residing at Clifton, in the county of Delaware and State of Pennsylvania, have invented a new and useful Improvement in Nut-Locks, which improvement is fully set forth in the following specification and accompanying drawings.

My invention consists of a nut lock or fastener formed of a ratchet and engaging-pin, said parts being on contiguous nuts and the latter being adapted to work on a right and left threaded bolt, all as will be hereinafter set forth.

Figure 1:
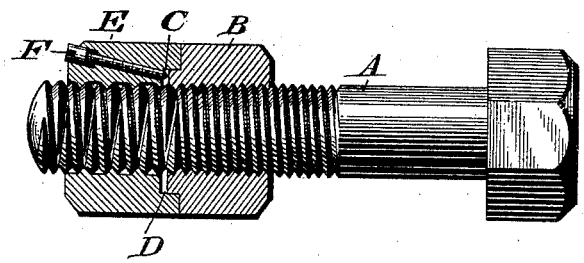
Figure 2:

Figure 1 represents a longitudinal section of a nut-lock embodying my invention. Fig 2 represents a face view of nuts to which my invention is applied.

Similar letters of reference indicate corresponding parts in the two figures.

Referring to the drawings, A designates a bolt having a right and left screw-thread, and B designates a nut which is to be locked or fastened. On the outer face of said nut is a ratchet C, which extends around the opening of the nut and is adapted to enter a groove D in the rear face of a nut E, the latter being fitted on the bolt A and contacting with the nut B, said groove thus receiving said ratchet, the ratchet and groove being some distance from the sides or side edges of the nuts, whereby they are concealed, and also serving to prevent dirt, &c., from reaching the latter.

In the nut E is an opening, which extends from the front to the rear thereof, and in the same is fitted a screw, pin, or bolt F, whose point engages with the ratchet C and interlocks with the contiguous tooth thereof. The ratchet C is on the outer face of a rib on the nut B, thus raising said ratchet, and deeply seating the same in the groove D, which is sunken below the inner face of the nut E, thus inclosing the ratchet so that it cannot be reached by dirt, &c., as has been stated. The rib as such is centered in the groove and its ratchet-face is left free from contact with the back of said groove, thus preventing when the nuts are rotated a grinding action on the ratchet and the breaking off of the teeth thereof.

The operation is as follows: The bolt is located and the nut B screwed thereon to the desired extent. The nut E is also screwed on the bolt, but in the reverse direction to the nut B. When the nut E is tightened against or contacts with the bolt A, the screw F, whose head is at the front of the nut E, is properly rotated, whereby its point interlocks with the ratchet, as has been stated, whereby the nut E is prevented from unscrewing, and thus the nut B is securely fastened or locked. The screw F extends, preferably, in an oblique or diagonal direction through the nut E, so that any unscrewing force exerted on said nut has the tendency to direct the point of the screw toward the wall of the groove D, thus preventing said point from being broken off, which would be the case if the point rested in the ratchet at a right angle thereto. When the screw F is loosened so as to be disconnected from the ratchet, the nut E may be unscrewed, and as the nut B is no longer controlled by the nut E said nut B may also be unscrewed and removed from the bolt.

Having thus described my invention, what I claim as new, and desire to secure by Letters Patent, is—

Two nuts with screw-threads in reverse directions, the outer nut having a sunken groove on the inner face thereof, and the inner nut having a raised ratchet on the outer face thereof, said ratchet being centered and freely seated in said groove, and a removable screw passing through the outer nut, having its point within the groove in engagement with the ratchet, the head of the screw being on the outside of the outer nut, said parts being combined with a right and left threaded bolt, substantially as described.

WALTER GLEDHILL.

Witnesses:
JOHN A. WIEDERSHEIM,
A. P. JENNINGS.